Oct. 10, 1967  H. E. EKLUND  3,346,142
LIQUID DISPENSING SYSTEMS

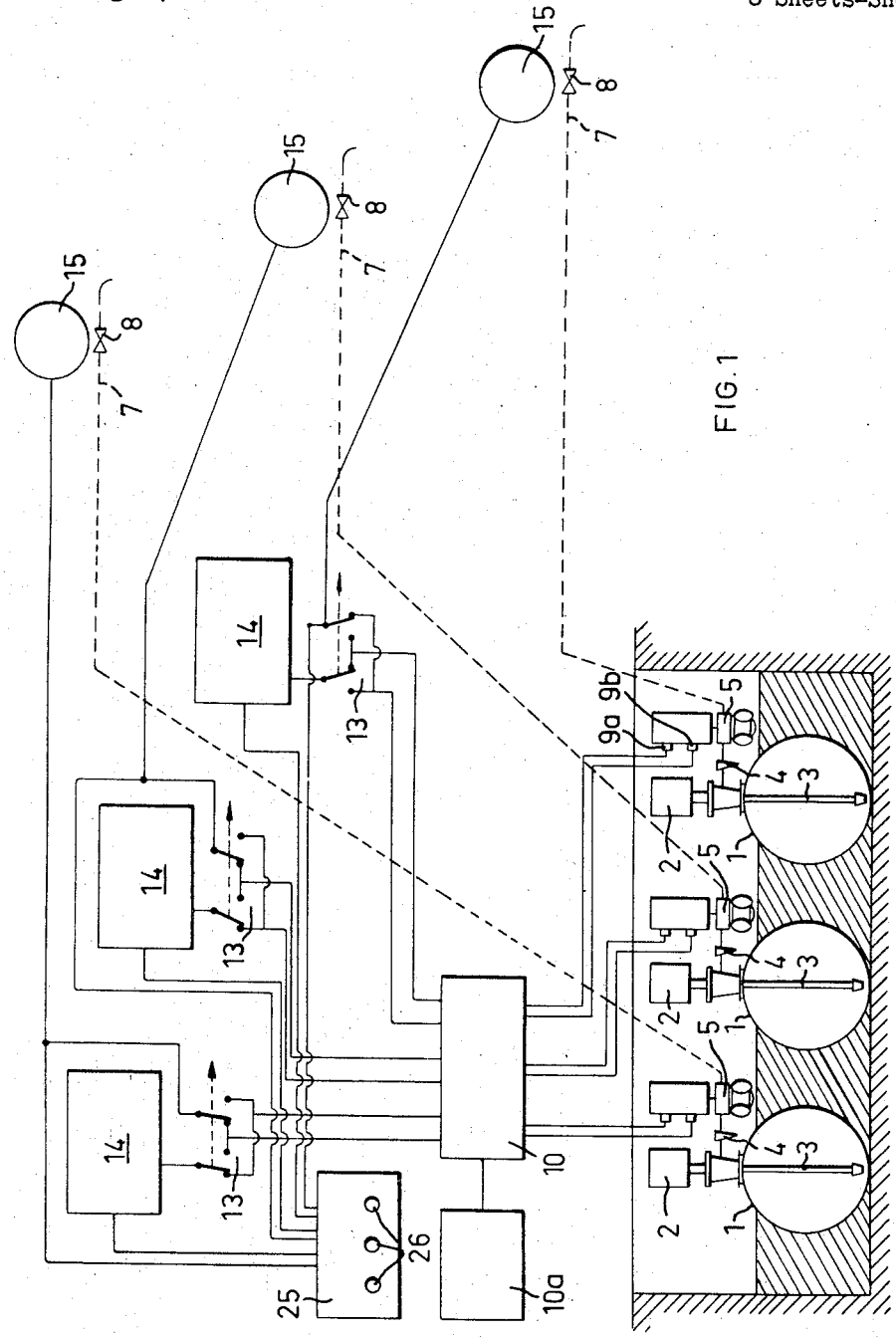

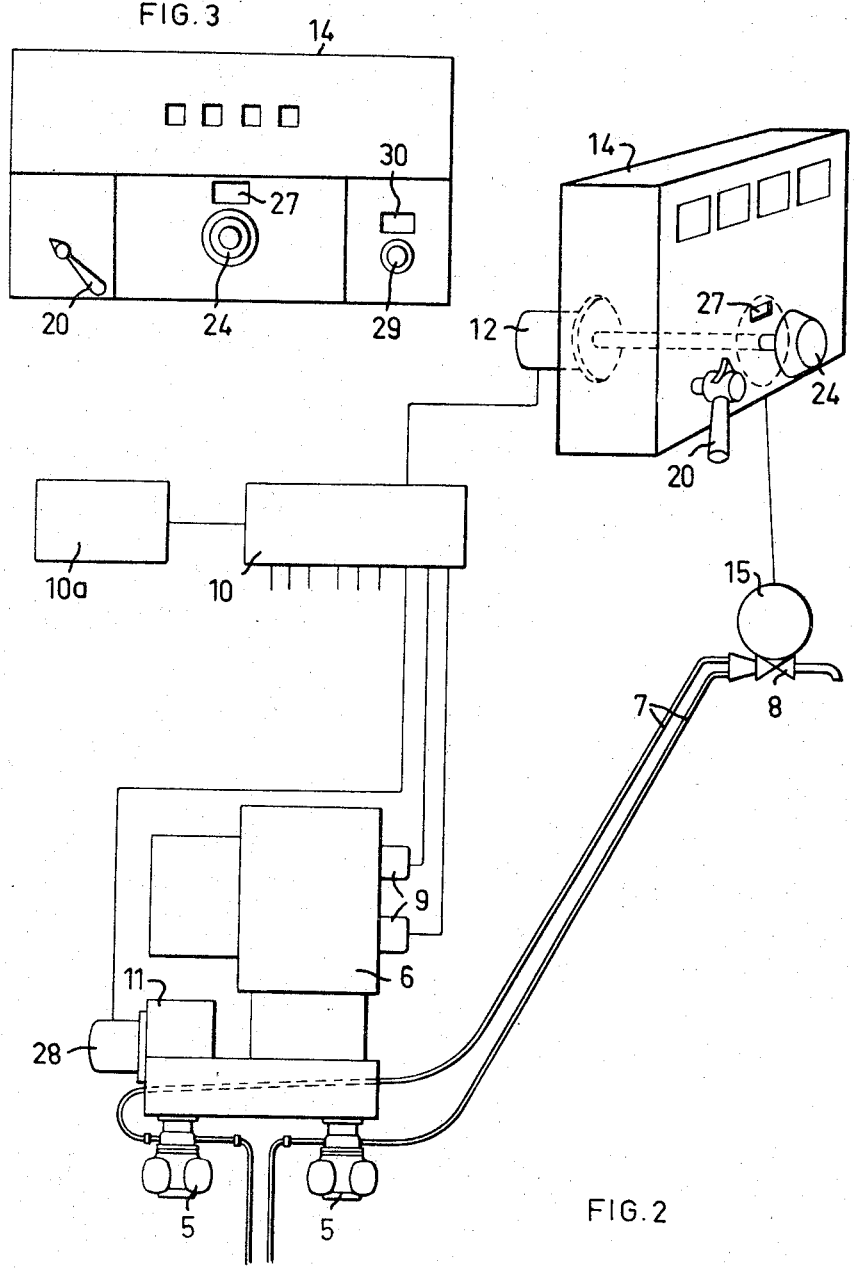

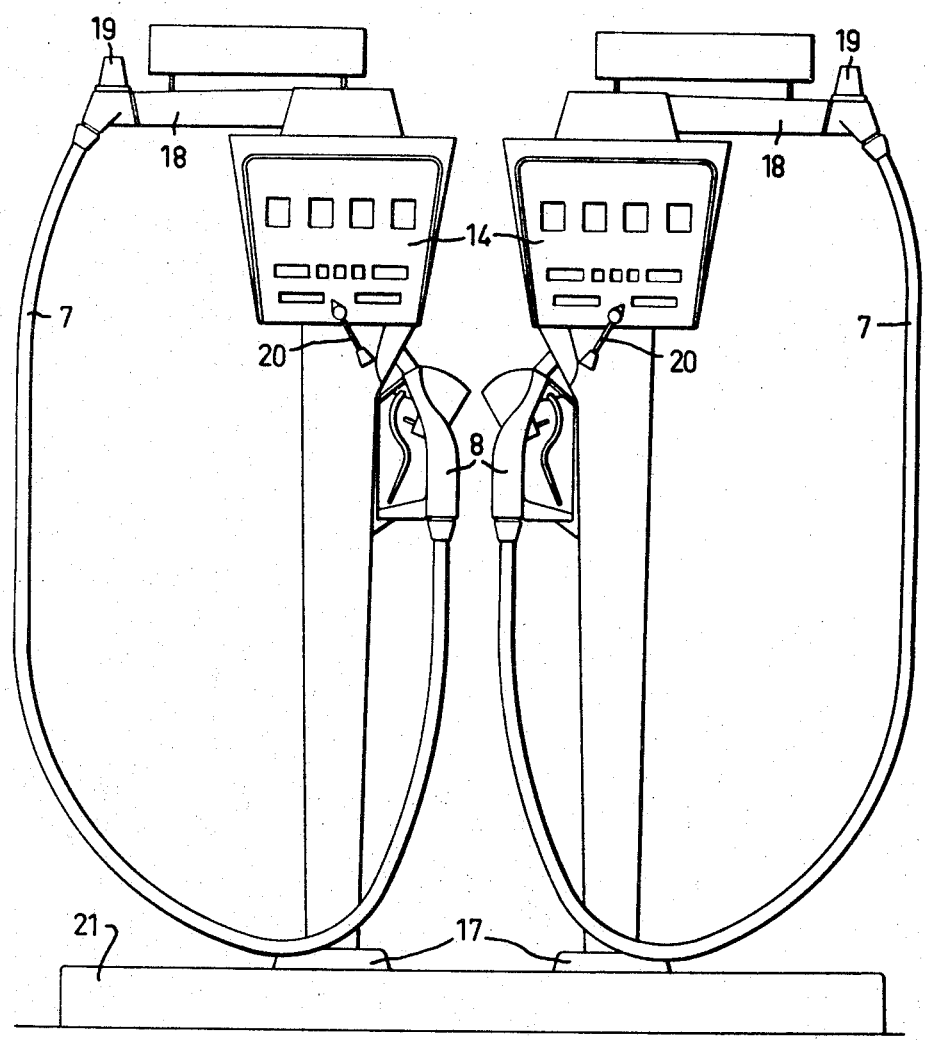

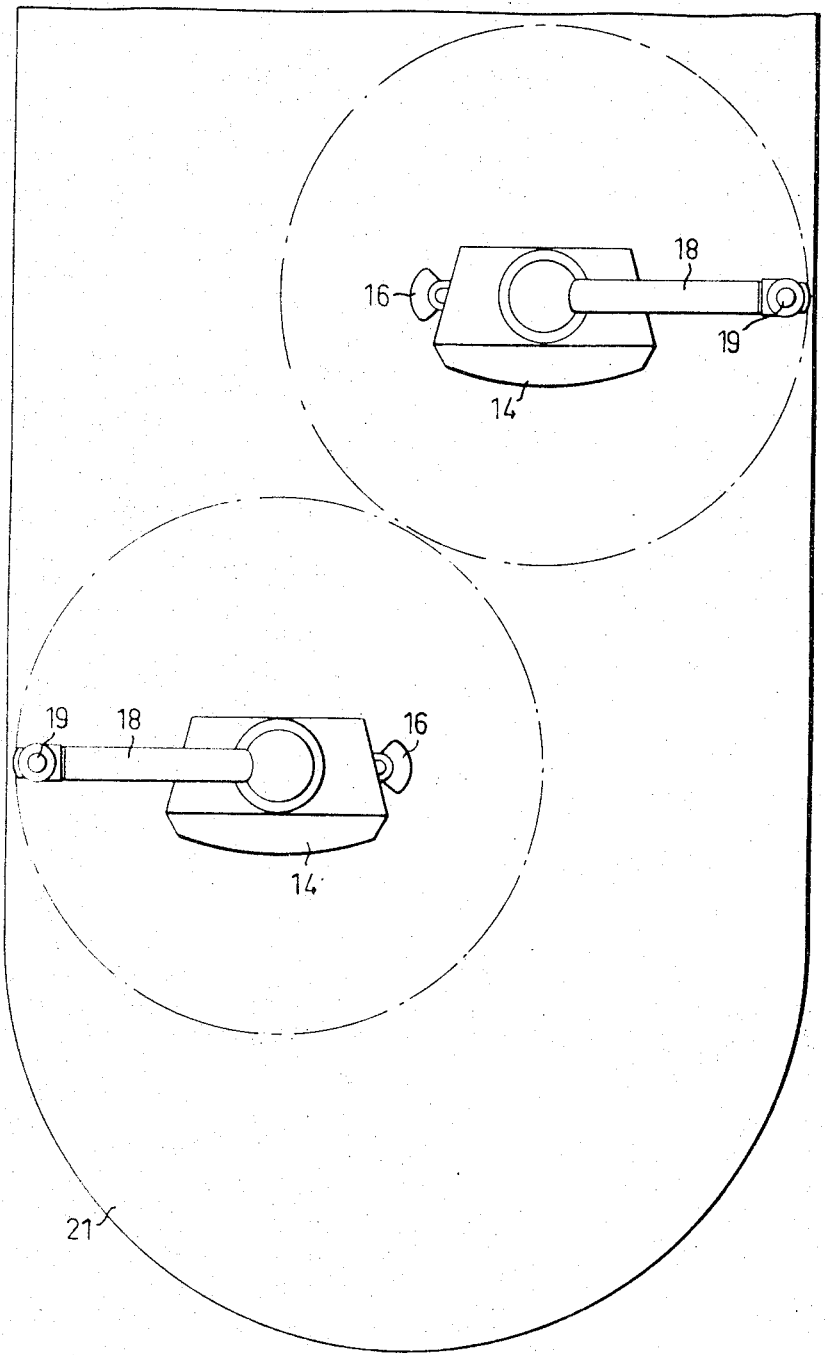

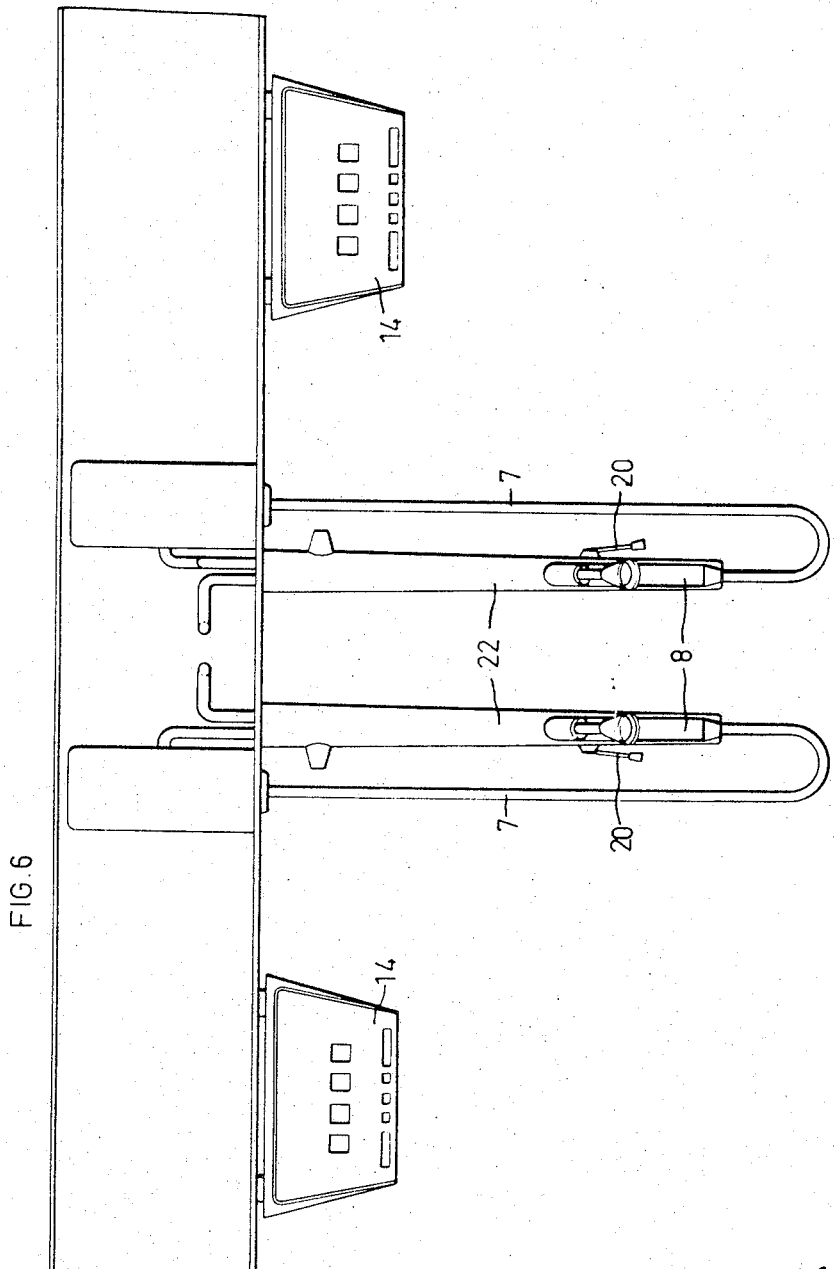

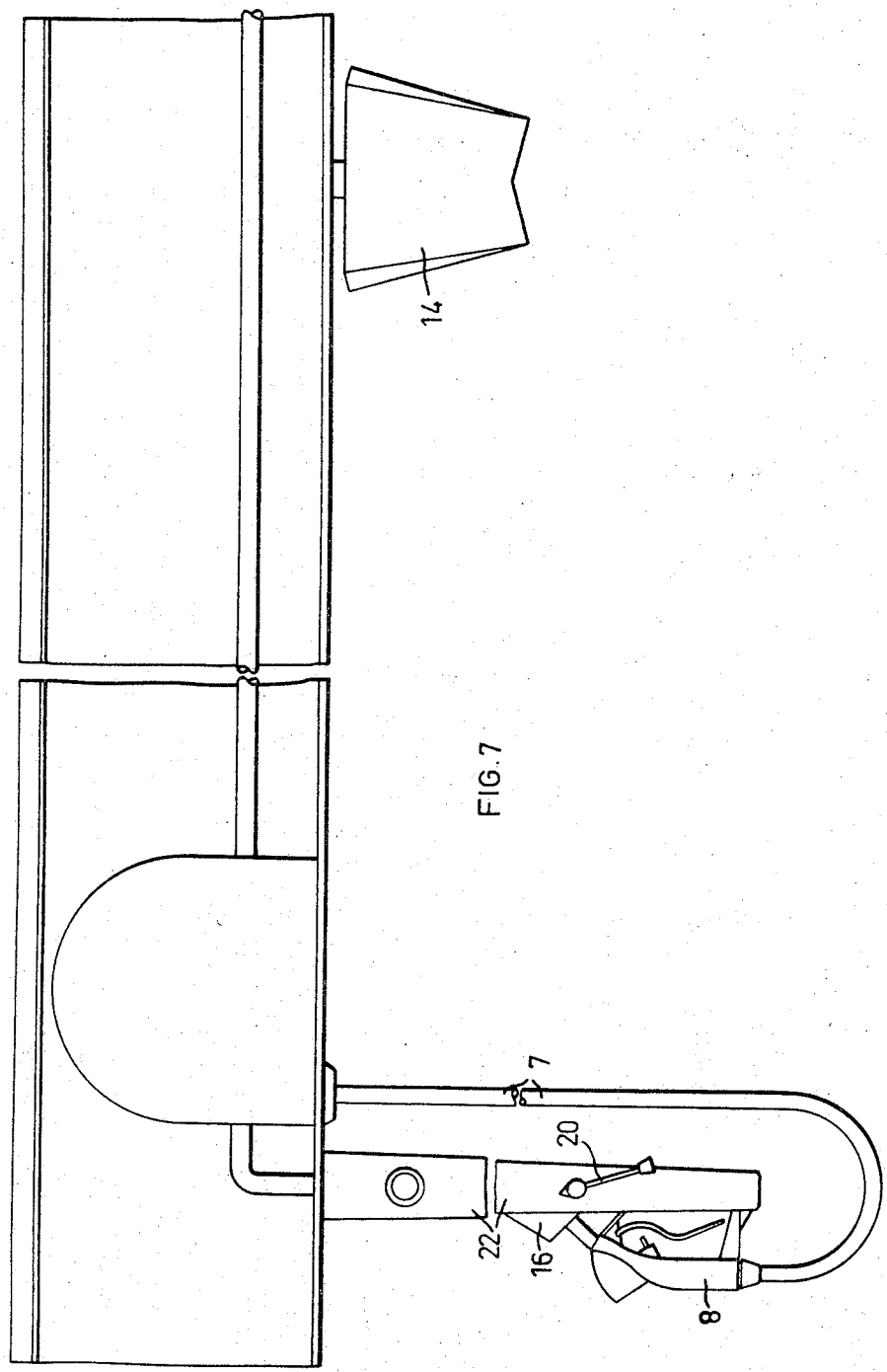

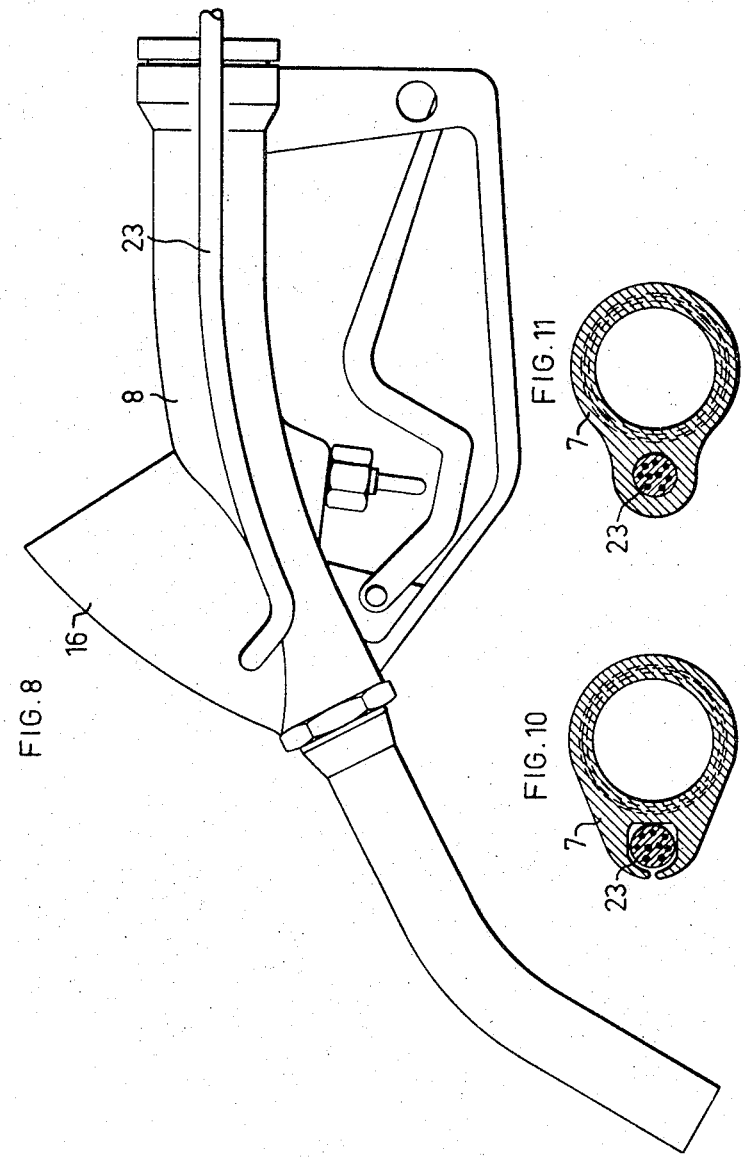

Filed Aug. 5, 1966  8 Sheets-Sheet 8

Hans Erik Eklund,
Inventor
By Wenderoth, Lind & Ponack,
Attorneys

United States Patent Office 3,346,142
Patented Oct. 10, 1967

3,346,142
LIQUID DISPENSING SYSTEMS
Hans Erik Eklund, Malmo, Sweden, assignor to Aktiebolaget Ljungmans Verkstader, Malmo, Sweden
Filed Aug. 5, 1966, Ser. No. 570,639
Claims priority, application Sweden, Aug. 17, 1965, 10,724/65
9 Claims. (Cl. 222—20)

This invention relates to a system for dispensing liquid products comprising one or more throughflow type meters each having a volume and a price pulse transmitter converting the readings of the meter into electrical pulses.

In systems for dispensing liquid products through throughflow type meters it is already known to arrange several read-out systems for simultaneous indication of the volume and price of the liquid amount flowing through the meter. It is also previously known to arrange one of the read-out systems portable so that it can be placed practically wherever it is desired. However, it often happens that none of the systems can be read during the dispensing operation proper. This may involve the risk of floating for example the tank of a motor vehicle so that the excess liquid which is extremely inflammable splashes around the inlet to the tank, thus occasioning immediate risk of fire. There is thus a great demand for a dispensing installation that ensures greater safety from many points of view, particularly with regard to the ever increasing selfservice offered by such installations. For rationalization purposes it is desirable to reduce the operating and manufacturing costs of the type of installations referred to, without disregarding all the demands that are placed on them.

This invention eliminates the above mentioned drawbacks in that a switching device is adjustable into two positions, and in one of these two positions connects a first of two separate read-out indicators associated each with one of the throughflow meters, to the volume pulse transmitter of the throughflow meter and the second of said read-out indicators to the price pulse transmitter, and in the other switching position connects the first read-out indicator to the price pulse transmitter and the second read-out indicator to the volume pulse transmitter of the throughflow meter.

For further elucidation of the invention some embodiments of the liquid dispensing system will be described more in detail in the following with reference to the accompanying drawings, in which:

FIG. 1 is a schematical view showing the principle of a liquid dispensing system according to the invention;

FIG. 2 is a schematical view showing the principle of a system comprising blend type meters for admixing oil to gasoline (petrol);

FIG. 3 is a view showing a read-out indicator including switching, presetting and selecting means;

FIG. 4 is a front elevational view of the FIG. 1 system in an embodiment having two separate dispensing apparatuses;

FIG. 5 is a top plan view of the embodiment shown in FIG. 4;

FIG. 6 is a front elevational view of a second embodiment of the system having two separate dispensing apparatuses;

FIG. 7 is a side elevational view of the embodiment in FIG. 6;

FIG. 8 is a partial section of a hose nozzle for the liquid dispensing system;

FIG. 10 is a section of a hose associated with the liquid dispensing system;

FIG. 11 is a section of another embodiment of a hose associated with the liquid dispensing system.

Figure 9:
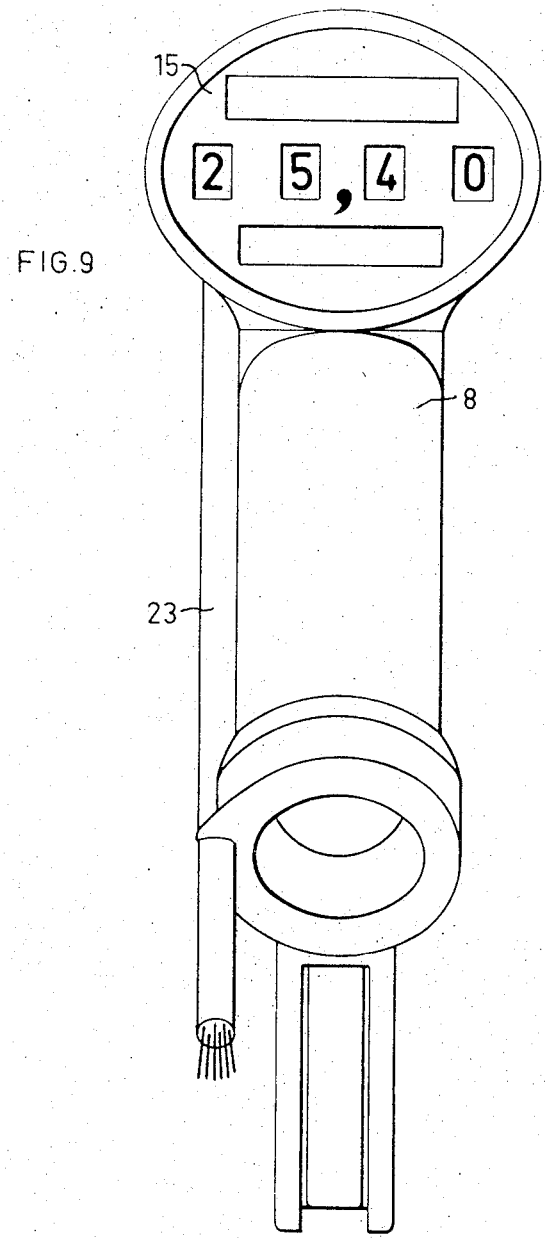
FIG. 9 is a view showing the hose nozzle in FIG. 8 as seen from above in a slightly oblique direction.

The liquid dispensing system schematically illustrated in FIG. 1 incorporates a plurality of underground tanks 1, containing different types of fuel and equipped with conventional pump units 2, suction pipes 3, filters 4 and throughflow meters 5. To each throughflow meter are connected mechanical counters 6, viz. a counter for registering the volume dispensed and a counter for calculation of the price of such volume, and a dispensing apparatus including a hose nozzle 8 is connected by way of a hose 7 to each such throughflow meter. Associated with each of the counters 6 is a pulse transmitter 9 converting the readings of the counter into electrical pulses. There is thus provided a price pulse transmitter 9a and a volume pulse transmitter 9b. The mechanical counters may be dispensed with, thus permitting connection of a volume pulse transmitter on one hand directly to the throughflow meter and on the other hand to a counter which in turn supplies a price pulse transmitter. The pulse transmitters for the respective throughflow meters in a liquid dispensing system are independently connectible via a feed box 10 and a switching device 13 to their read-out indicators 14 and 15. Said read-out indicators each have four electronic indicator tubes for indicating respectively the price and the volume of the amount dispensed by that throughflow meter the pulse transmitter of which has been connected to the tubes via pulse counters. The feed box 10 is connected to an electrical source of current 10a for the entire electrical circuitry of the system.

The pulses are fed from the feed box 10 by the pulse transmitters 9a and 9b via the switching device 13 to the two separate read-out indicators 14 and 15. In one position of the switching device 13 the read-out indicator 14 indicates the price and the read-out indicator 15 the volume of the amount dispensed, and in the other position of the switching device the read-out indicator 14 shows the volume while the read-out indicator 15 shows the price of the dispensed quantity.

The switching device 13 is preferably placed at the place of dispensing proper or where the hose nozzle 8 is hooked up. The hose nozzle is connected to one of the throughflow meters 5 via the hose 7. The read-out indicator 14 is disposed in the vicinity of the switching device 13 while the read-out indicator 15 is disposed on the hose nozzle 8 proper. The indicator 15 is of the miniature type and accommodated in an explosion-proof housing 16 separated from the hose nozzle proper. The housing 16 may of course also be integral with the hose nozzle 8.

The provision of a read-out indicator on the hose nozzle makes for an increased dispensing speed as the operator can fully concentrate on the filling of the tank of the motor vehicle without having to glance at and follow the dispensing operation on an adjoining meter or read-out indicator which may even be difficult to read from where the operator is placed.

Liquid dispensing systems constructed in accordance with the present invention besides provide an additional saving in that each read-out indicator is equipped with one row of digits only which by a simple motion can be caused to indicate either cents or gallons (shillings or gallons).

The respective read-out indicators 14 and 15 are connected via an electric sensing means to a ticket printing apparatus 25 equipped with push buttons 26, one for each dispensing point. Upon depression of a button the customer receives a ticket showing the volume and price of the dispensed quantity, as well as the quality and date.

The liquid dispensing system may also be constructed for credit selling and comprise a means for automatic check up of the customer's identity card, or credit card, said means identifying and recording the customer, for example electronically, before dispensing can be effected.

FIG. 2 illustrates the principle of the invention as applied to a kerbside pump for admixing oil to gasoline (petrol). The gasoline (petrol) is pumped through a throughflow meter 5 and the oil through another throughflow meter 5 to the respective hoses 7 which are brought together at the hose nozzle 8 which is common to them. The read-out indicator 14 is equipped with a special selecting mechanism 24 by which the desired oil admixture is set. The oil admixture set can be read in a window 27. The selecting mechanism is equipped with a synchro follower 12 which is connected over an electric line to the feed box 10 and a second synchro follower 28 mounted on a blend gearing 11 disposed between the throughflow meters 5 and the counter 6. The angle of rotation of the shaft of the armature in the synchro follower 28 thereby automatically follows that of the armature of the synchro follower 12. The value set on the selecting mechanism is thus transmitted to the blend gearing which controls the ratio of oil to gasoline (petrol). The selecting mechanism may also be adapted for setting the desired octane content.

FIG. 3 shows a read-out indicator for a meter according to FIG. 2 but supplemented with a lockable presetting device 29 which permits setting of the quantity desired or of the sum for which the customer wants to buy, said quantity or sum being indicated in a window 30. When the lever 20 is set for cents (shillings) the digit value in the window 30 corresponds to cents (shillings) and when the lever is set for gallons the digit value in said window corresponds to the number of gallons.

FIG. 4 shows an embodiment of two fuel dispensing points on an island 21. Mounted on posts 17 each having a swing arm 18 and a sightglass 19 is one read-out indicator 14 and a lever 20 serving to set the switching device 13. Connected to the swing arm 18 via the sightglass 19 is one end of the hose 7 the other end of which is connected to the hose nozzle 8. Said hose nozzle is hung on the post 17 in a conventional suspension means. Each hose nozzle 8 is provided with an enlarged portion or housing 16 which accommodates the read-out indicator 15. When the lever 20 is in the FIG. 4 position on the post to the right in the figure the volume of the dispensed fuel quantity is indicated on the read-out indicator 14 and the price of said dispensed fuel quantity is indicated on the read-out indicator 15. On the left-hand post in FIG. 4 the lever 20 occupies the opposite position, the read-out indicator 14 showing the price and the read-out indicator 15 the volume of the dispensed fuel quantity. FIG. 5 is a top plan view of the embodiment illustrated in FIG. 4.

In the FIG. 6 embodiment of a system according to the present invention the dispensing or metering points are disposed in a hanging position beneath a protective roof. As distinct from the embodiment in FIGS. 4 and 5 the read-out indicators 14 are mounted in the roof structure while the hose nozzles and the switching levers 20 are disposed on pipes 22 depending from the roof. In this embodiment no island 21 is required as in the embodiment of FIGS. 4 and 5, for which reason the installation requires a considerably reduced spaced. FIG. 7 shows a side elevational view of the embodiment illustrated in FIG. 6. It should be observed that a hose reel is suspended from the roof so that withdrawal of a suitable length of the hose 7 is possible.

The present invention thus makes it possible to place the kerbside pump with meters and counters on a suitable spot outside of the trafficked area of a service station, for example in immediate connection with an underground tank. This allows a better exploitation of the station area with resulting greater survey-ability and quicker service.

The hose nozzle 8 utilized in the various installations is shown in FIG. 8. It will be clearly apparent that the hose nozzle mainly is shaped like a conventional hose nozzle except that it is provided with an enlarged portion or housing 16 which accommodates the miniature type read-out indicator 15. The housing 16 can be disposed in a unit separated from the hose nozzle proper or be integral with it. What is important is that the read-out indicator proper and the means associated therewith are enclosed in an explosion-proof envelope. It should be stressed here that the housing 16 incorporates in addition to the read-out indicator a transformer which is adapted to step up the pulses from the pulse transmitters 9. The read-out indicator 15 thus is connectible over the switching device 13 to the price pulse transmitter 9a or the volume pulse transmitter 9b depending upon the position of the switching lever 20. This connection is realized by means of a cable 23 which is drawn in an explosion-proof manner into the housing and extends along the hose 7 to the switching device 13.

The hose nozzle 8 is shown in plane view in FIG. 9, as seen obliquely from above.

FIGS. 10 and 11 show two different embodiments of the hose 7 connecting the hose nozzle 8 to the respective throughflow meter 5. In the embodiment shown in FIG. 10 the cable 23 is disposed in a recess in the hose 7. The walls of said recess enclose the cable 23. As shown in FIG. 11, the cable 23 can also be integral with the hose 7.

The invention thus is adapted particularly for use in fuel service stations and wherever there is a demand for speedy service. Installations according to the invention can be designed either for service by special staff or for self-service. In the latter case, the service station can be manned only with a supervisor or not be manned at all. When unmanned the throughflow meters in the service station are connected to a bank-note or coin operated mechanism which automatically effects the supervision so that metering is blocked either mechanically or by electrical magnet valves or by the pump motors.

While various embodiments of the present invention have been described in the foregoing it is obvious to those skilled in the art that many further modifications can be resorted to within the scope of the invention defined in the appended claims.

What I claim and desire to secure by Letters Patent is:

1. A system for dispensing a liquid product comprising a throughflow type meter having means for generating electrical pulses in accordance with the volume of the liquid product flowing through the meter, means for generating electrical pulses in accordance with the price of the liquid flowing through the meter, switch means switchable into two positions, first digit read-out means connectible to said volume pulse generating means with said switch means in one of said two positions, and to said price pulse generating means with said switch means in the other of said two positions, and a second digit read-out means connectible to said price pulses generating means with said switch means in said one of said two positions and to said volume pulses generating means with said switch means in said other of said two positions.

2. A system according to claim 1, wherein said second digit read-out means is disposed in a conventional nozzle through which the liquid product is dispensed and said first digid read-out means is disposed at an arbitrary place.

3. A system according to claim 1, wherein said first digit read-out means has arbitrary adjustable means for interrupting the flow of said liquid product when a predetermined volume has been dispensed.

4. A system according to claim 2, wherein said nozzle substantially has the form of a conventional hose nozzle.

5. A system according to claims 1 and 2, wherein said second digit read-out means is mounted on said nozzle in an explosion-proof housing to which electric leads from said switch means are connected in an explosion-proof manner.

6. A system according to claim 5, wherein said leads are arranged in a cable extending from the switch means along a delivery hose one end of which is connected to said nozzle and the other end to said meter.

7. A system according to claim 6, wherein said cable is built into said delivery hose.

8. A system according to claim 6, wherein said cable extends in a recess in said delivery hose, whereby the sides of said recess surround the cable.

9. A system according to claim 5, wherein said explosion-proof housing contains a transformer which is connected between the leads from said switch means and said second digit read-out means, whereby the amplitude of the pulses to said digit read-out means can be maintained at a lower level for improving the explosion safety of the system.

References Cited

UNITED STATES PATENTS

| | | | |
|---|---|---|---|
| 3,122,271 | 2/1964 | Grant | 222—17 |
| 3,206,071 | 9/1965 | Boudot et al. | 222—20 |

ROBERT B. REEVES, *Primary Examiner.*

STANLEY H. TOLLBERG, *Examiner.*